(No Model.)
W. T. ADEL & S. F. LEIB.
CLOD PULVERIZER.
No. 593,040. Patented Nov. 2, 1897.
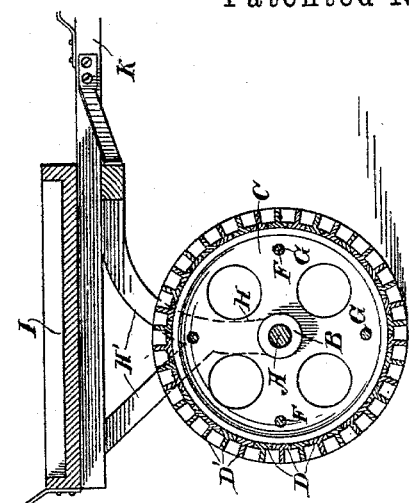
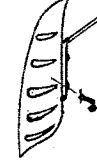
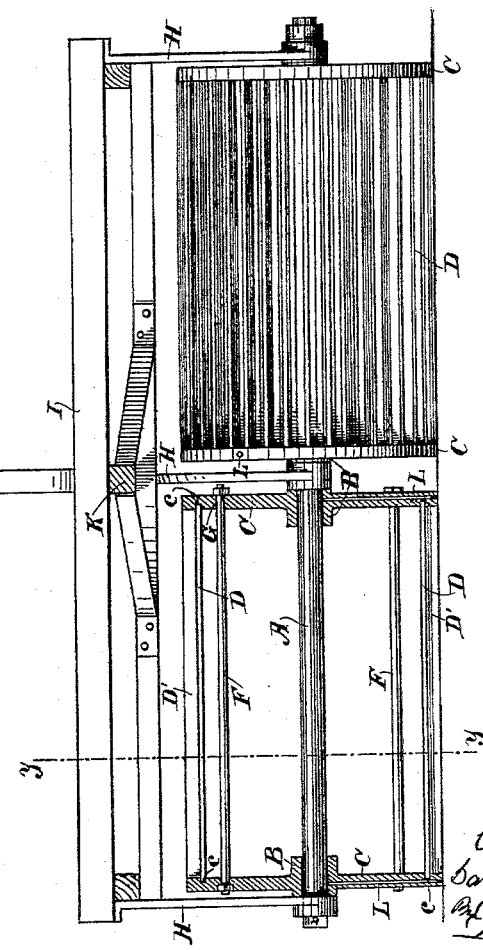
Witnesses,
Inventors,
Wilmer T. Adel
Samuel F. Leib
By Dewey & Co.
Atty

UNITED STATES PATENT OFFICE.

WILMER T. ADEL AND SAMUEL F. LEIB, OF SAN JOSÉ, CALIFORNIA; SAID LEIB ASSIGNOR TO SAID ADEL.

CLOD-PULVERIZER.

SPECIFICATION forming part of Letters Patent No. 593,040, dated November 2, 1897.

Application filed July 1, 1897. Serial No. 643,106. (No model.)

*To all whom it may concern:*

Be it known that we, WILMER T. ADEL and SAMUEL F. LEIB, citizens of the United States, residing at San José, county of Santa Clara, State of California, have invented an Improvement in Clod-Pulverizers; and I hereby declare the following to be a full, clear, and exact description of the same.

Our invention relates to a machine which is especially designed for the crushing and pulverizing of clods of earth; and it consists, essentially, in a novel construction of a roller or rollers mounted upon a shaft, with means for propelling the rollers over the ground, and in details of construction, which will be more fully explained by reference to the accompanying drawings, in which—

Figure 1 is a front view of our pulverizer, one of the rollers being shown in section. Fig. 2 is a sectional end view on line $y\ y$ of Fig. 1. Fig. 3 is a detail of a cross-bar and its respective end disk.

The object of our invention is to provide a machine easy to be constructed and assembled which is designed to be drawn or propelled over ground which has been plowed and in which there are large hardened clods which cannot be broken or pulverized by ordinary means. Such clods accumulate in large quantities on the class of alluvial soil which contains a certain quantity of clay which is locally known as "adobe." This soil when plowed turns up in lumps or clods which cannot be pulverized with a harrow, and when the rains have ceased and the dry season commences these clods remain in such a quantity and so hard that the land becomes almost valueless for raising grain or other purposes unless these clods can be broken. In order to construct a suitable device by which such clods may be broken, we employ one or more rollers with peculiarly-fluted surfaces. In the present case we have shown two rollers mounted in line with each other upon a shaft A. This shaft has fitted to turn loosely upon it the hubs B of the disks or heads C, which form the ends of the rollers. These disks are made circular and are formed with annular grooves $c$, made around the interior peripheries of each of them to face each other. These grooves or channels are adapted to receive the ends of the steel bars D. These bars are of such a length and width as to extend between the heads C, and the edges meet and thus form a cylindrical periphery of each roller. The bars as here shown are made of rolled steel about one and one-half inches wide and about one-fourth of an inch thick. From the center of the outer surface of each bar projects a rib D'. These ribs are approximately about one-fourth of an inch in thickness, and they project from the face of the bars D about one and one-fourth inches, making the whole depth from the inner faces of the bars D to the outer edges of the ridge D' an inch and a half. These ribs D' are as much shorter than the bars D as the depth of the annular slots or channels $c$, so that when the roller is put together the bars D are assembled around the periphery of each of the heads C with their ends extending into the grooves $c$, the edges of the bars D lying close together, so as to make a complete cylindrical closure. The two heads are then drawn together by bolts F, which extend through holes G in the heads and have nuts upon one end by which they may be drawn up as tightly as may be desired, the ends of the ribs D' abutting against the inner faces of the heads C and projecting outwardly beyond the peripheries of the heads, the distance from the channel $c$ to the outer peripheries of the heads being small enough to allow the ribs D' to thus project, as shown. By this construction we are enabled to make a very cheap and durable roller which is easy to assemble or take apart when desired.

The shaft A passes through the hubs B and may be made rectangular or polygonal at one end where it fits into one of the standards or supports H. Near the center it passes through the central enlargement of a similar standard H and at the opposite end may have a nut or other means for securing it after passing through the standard at that end. This gives three points of support, and the standards H are forked or spread at the upper end, as shown at H', and have secured to them the weight-box I. A seat J is also properly secured to the weight-box for the driver. From the front of this weight-box extends a pole K, suitably disposed for the attachment of a team of animals by which the machine can be drawn over the ground, or, if preferred, it may be driven by other power.

In order to properly lubricate the shaft A where it passes through the hubs B, we have shown an oil-hole L, which may be cast within the head C and extend inwardly from the periphery to the hole in the hub, the outer end being closed by a screw-plug or otherwise. This allows of sufficient lubrication from time to time.

Having thus described our invention, what we claim as new, and desire to secure by Letters Patent, is—

1. A clod-crusher consisting of a plurality of rollers mounted and turnable upon a single shaft, said rollers being composed of heads having central hubs for the shaft and having continuous annular channels made in them near their peripheries, bars fitted between said heads, having a central rib made shorter than the bars so as to leave projecting ends on said bars adapted to enter said channels or grooves, bolts extending through from one head to the other of each roller and nuts whereby they may be drawn up to lock a continuous series of bars into place to form the closed periphery of the rollers, with projecting crushing-ribs, a weight-box and forked standards supporting the same.

2. A clod crushing and pulverizing roller consisting of steel T-bars, the projecting lug of each of which is shorter than the transverse head portion, circular heads or disks having grooves or channels made around their inner faces near the outer periphery adapted to receive the projecting ends of the T-bars whereby the central rib abuts against the outer portion of the heads and projects radially beyond them, bolts extending from one head to the other of each of the rollers with nuts whereby the heads are drawn and locked firmly against the ends of a series of T-bars which form a continuous periphery for the roller with outwardly-projecting ribs, hubs projecting centrally from the ends of the heads of the disks, a shaft passing loosely through said heads so that one or more of the rollers are turnable upon the shaft, oil-supply holes extending inwardly from the periphery of the disks to the hub-openings, and having screw-plugs closing the outer ends, standards at the ends and intermediate the rollers through which the shaft passes, in the outer ones of which it is fixed, said standards being forked at the upper end adapted to support a weight-carrying box and driver's seat, a pole and team attachments secured and projecting forwardly from the box whereby the machine is propelled over the ground.

In witness whereof we have hereunto set our hands.

WILMER T. ADEL.
SAMUEL F. LEIB.

Witnesses:
CHARLES M. LORIGAN,
W. C. ANDREWS.